Patented Mar. 27, 1928.

1,664,341

UNITED STATES PATENT OFFICE.

LESLIE MILTON WISE, OF McKEESPORT, PENNSYLVANIA.

PAINT.

No Drawing.   Application filed June 6, 1925.   Serial No. 35,481.

This invention relates to paints for the exterior and interior of buildings.

An object of the invention is the provision of a paint having an ingredient which when applied to surfaces will prevent deterioration of the paint when subjected to variations in temperature.

A further object of the invention is the provision of a paint which has its main body ingredient formed of carbide sludge thereby forming a paint which will give a hard surface when dry and which will resist the effects of heat and cold.

This invention will be best understood from a consideration of the following detailed description, nevertheless it is to be understood that the invention is not confined to the disclosure, being susceptible of such changes and modifications which shall define no material departure from the salient features of the invention as expressed in the appended claims.

In plants for the generation of acetylene gas a predetermined quantity of water and calcium carbide are brought together which generates acetylene gas, leaving an impure calcium hydroxide which is known commercially as carbide sludge. I have found that the sludge after having been dried and ground to a fine powder is useful for forming paint compositions. I have also found that certain sludges produced from calcium carbide have qualities which are more effective for the production of a paint than sludges formed from calcium carbide which has been manufactured in an entirely different manner so that the sludges from calcium carbide manufactured in different countries or by different processes have therefore qualities which are distinct from the qualities of other sludges. In the preparation of paint the carbide sludge is removed from the generator in a semi-wet state and then thoroughly dried. The sludge then is passed through a mill and pulverized until all hard or calcareous particles have been reduced.

To the proper proportions of the sludge and coloring matter is added any suitable oil for the purpose such as Japan oil or linseed oil and thoroughly incorporated in the ingredients in a paint mill. Before the sludge is mixed with the oil and coloring matter it is dried and then passed through a grinding mill whence it is pulverized so that it may be thoroughly incorporated in the oil.

The composition of the paint consists of approximately 6 pounds of carbide sludge, 1 pint of a coloring matter, and these quantities of the sludge and coloring matter are added to sufficient oil to form a gallon of paint.

The sludge forms the body of the paint and as such when dry provides an extremely hard surface which is not affected by temperature changes and will withstand a relatively high temperature without causing any deterioration in the paint. When combined with an oil and applied to a surface, whether metal or wood, the paint will adhere to such materials and stand for a longer time than the usual lead or zinc paint.

In the use of the paint for metal surfaces it is found very effective to preserve the metal surfaces and thus prevent rust.

What I claim is:

A paint comprising a mixture of approximately six pounds of finely divided carbide sludge, one pint of coloring matter and sufficient linseed oil to form a gallon of paint.

LESLIE MILTON WISE.